United States Patent Office 3,281,503
Patented Oct. 25, 1966

3,281,503
MIXED ANHYDRIDES OF DIALKYLDITHIOPHOSPHORIC AND CARBOXYLIC ACIDS AND METHOD OF PREPARATION
Alexis A. Oswald, Westfield, N.J., assignor to Esso Research and Engineering Company, a corporation of Delaware
No Drawing. Filed Feb. 27, 1963, Ser. No. 261,486
8 Claims. (Cl. 260—935)

The present invention relates to new and useful organic phosphate compounds and a method for preparation thereof.

These new compounds, which are characterized by outstanding pesticidal activity, are mixed anhydrides of certain dialkyldithiophosphoric and aromatic carboxylic acids and correspond to the general formula

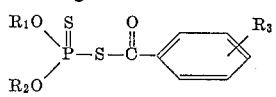

wherein $R_1$ and $R_2$ are selected from the group consisting of methyl and ethyl radicals and $R_3$ is a member of the group consisting of hydrogen, methyl, $-NO_2$, $-NH_2$ and halogen such as chlorine, bromine or fluorine.

These new compounds are valuable in combating insects such as roaches and houseflies and possess rodenticidal and fungicidal properties. The mixed anhydride of diethyldithiophosphoric acid and benzoic acid, for example, is an insecticide comparable with DDT and Malathion according to laboratory tests on American roaches and houseflies.

The organic phosphate compounds of the present invention may be readily prepared by reacting dimethyl-, diethyl- or mixed methyl-ethyl-dithiophosphoric acid with aromatic carboxylic anhydrides such as the anhydrides of benzoic, chlorobenzoic, bromobenzoic, nitrobenzoic, chloronitrobenzoic, hydroxybenzoic and aminobenzoic acids as well as toluic acid and the corresponding substituted toluic acids. The reaction proceeds according to the following equation.

$(RO)_2P(S)SH + (R'CO)_2O \rightarrow$
$(RO)_2P(S)SCOR' + R'COOH$

The reaction can be readily carried out by simply heating an equimolar mixture of the reactants on a water bath. When working with large quantities, it is advantageous to carry out simultaneously the addition of the aromatic carboxylic acid anhydride to the heated dialkyldithiophosphoric acid and the removal of the aromatic carboxylic acid by-product. The reaction can be carried out at atmospheric pressure or, if desired, at a slightly decreased pressure (10–300 mm.). A similar reaction of dialkyldithiophosphoric acids may be carried out using aliphatic carboxylic acid anhydrides instead of the aromatic carboxylic acid anhydrides.

The organic phosphate products can be separated from the carboxylic acid by-products by distillation or in view of the fact that they are insoluble in water and quite stable toward water hydrolysis, the reaction mixture may be poured into water or washed with an excess of water in order to remove the carboxylic acid by-product.

The dialkyldithiophosphoric acids used may be readily prepared from phosphorus pentasulfide and the corresponding alcohol as described in J.A.C.S. 67, 1162 (1945).

The following examples are illustrative of the present invention.

Example 1

18.6 grams (0.1 mole) of diethyldithiophosphoric acid (B.P. 97–98° C. at 4 mm., $n_D^{20}$ 1.5068) were heated on a water bath with 22.6 grams (0.1 mole) of benzoic acid anhydride for 2 hours.

The benzoic acid precipitate was removed by filtration with suction. The filtrate (crude product) was washed with 5% aqueous sodium carbonate solution to remove all the benzoic acid by-product. The organic phase, 27 grams (88%) of an orange liquid, consisted essentially of the mixed anhydride of diethyldithiophosphoric acid and benzoic acid. This was confirmed by the nuclear magnetic resonance and the infrared spectrum of the product and by elemental analyses.

On attempted distillation at 1 mm. the product was found to distill at about 100° C. with decomposition. Both the crude and the distilled product had about equal effectiveness as insecticides.

The insecticidal activity of the mixed anhydride was then tested in a solvent consisting of a mixture of kerosene and acetone on American roaches as well as upon houseflies. The following table summarizes the results of these tests.

TABLE I

[Insecticidal activity (percent kill)]

| Concentration | Bloodstream Injection American Roach [1] | | | Topical Application Housefly [2] | | | | | |
|---|---|---|---|---|---|---|---|---|---|
| | 2.5% | 1.0% | 0.5% | 2.5% | 1.0% | 0.5% | 0.1% | 0.05% | 0.01% |
| Male | 100 | 100 | 100 | } 100 | 100 | 100 | 100 | 96 | 3 |
| Female | 100 | 100 | 100 | | | | | | |

[1] Sexes are tested separately with the roach since females are more resistant.
[2] No sex separation is made with houseflies.

Example 2

The mixed anhydride of Example 1 was tested for insecticidal activity with the corresponding diisopropyl compound. Both compounds were applied in the form of water emulsions.

The effect of these emulsions against Mexican bean beetles, pea aphides and mites was determined in the following manner:

Lima bean leaves sprayed on the dorsal and ventral surfaces were offered to ten larvae of the Mexican bean beetle (late second instar) for a 48 hour feeding period.

Adult pea aphides were sprayed and transferred to sprayed pea plants and held for 48 hour mortality determinations.

Lima beans are infested with 50–100 adults of the strawberry spider mite, Tetranychus atlanticus prior to testing. The infested plants are dipped into the test material and held for five days. The results of these tests are summarized in the following table.

TABLE II

| Mixed Anhydride at 0.05% Concentration | Percent Mortality on Test Organisms | | |
|---|---|---|---|
| | Mexican Bean Beetles 48 Hours | Pea Aphides (Contact) 48 Hours | Mites 5 Days |
| 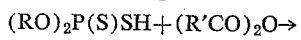 | 100 | 100 | 100 |
| 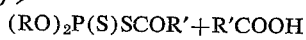 | 0 | 0 | 0 |

The above data show that the diethyl compound is an outstanding insecticide in contrast to the diisopropyl compound.

Example 3

A mixture of 37.2 grams (0.2 mole) of diethyldithiophosphoric acid and of 31.6 grams (0.2 mole) butyric acid anhydride was heated for 2 hours on a water bath in a distillation apparatus at 20 mm. pressure. At about 60° C. 15 grams (95%) of the butyric anhydride by-product distilled off and was collected. The distillation residue at this stage was the crude main product, S-butyryl-O,O'-diethylthiophosphate, which could be distilled between 85–87° C. at a pressure of 1 mm. to yield an orange liquid of $n_D^{20}$ 1.5070.

*Analysis.*—Calcd. for $C_8H_{17}O_3S_2$: C, 37.49; H, 6.68; S, 25.02. Found: C, 37.21; H, 6.79; S, 24.96.

Example 4

A mixture of 15.8 grams (0.1 mole) of dimethyldithiophosphoric acid and 25.4 grams (0.1 mole) of 4-toluic acid anhydride were heated at 70° for 2 hours. Subsequent workup of the reaction mixture in the manner described in the previous example yielded 23.5 grams (87%) of the mixed anhydride of dimethyldithiophosphoric acid and 4-toluic acid as an orange liquid distilling with decomposition between 98–100° C. at a pressure of 1 mm. Pesticidal tests of the compound showed it to be effective against insects and mites.

Example 5

A mixture of 18.6 grams (0.1 mole) of diethyldithiophosphoric acid and 31.6 grams (0.1 mole) of 4-nitrobenzoic acid anhydride was reacted as in the previous example to yield 28.5 grams (85%) of the mixed anhydride of diethyldithiophosphoric acid and 4-nitrobenzoic acid.

Example 6

The mixed anhydride of dimethyldithiophosphoric acid and 3-chloro-4-toluic acid was prepared in a similar manner and was found to be an effective insecticide.

The foregoing specification contains a limited number of embodiments of the present invention. It will be understood that numerous variations are possible without departing from the scope of the following claims.

What is claimed is:

1. Organic phosphate compounds corresponding to the general formula

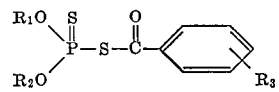

wherein $R_1$ and $R_2$ are selected from the group consisting of methyl and ethyl radicals and $R_3$ is a member of the group consisting of hydrogen, methyl, —$NO_2$, —$NH_2$, chlorine, bromine and fluorine.

2. The compound

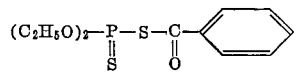

3. The compound

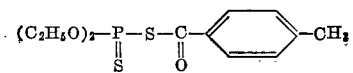

4. The compound

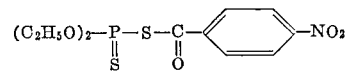

5. The method of preparing mixed anhydrides of dialkyldithiophosphoric acid and carboxylic acids which comprises reacting a dialkyldithiophosphoric acid containing from 1 to 20 carbon atoms per alkyl group with substantially an equimolar amount of the anhydride of a carboxylic acid selected from the group consisting of alkyl-, aryl- and aralkyl- and nitro-, amino- and halogen substituted alkyl-, aryl- and aralkyl carboxylic acids having from 2 to 10 carbon atoms per molecule at substantially atmospheric pressure.

6. The method of preparing mixed anhydrides of dialkyldithiophosphoric acid and carboxylic acids which comprises reacting diethyldithiophosphoric acid with substantially an equimolar amount of benzoic acid anhydride by heating the same on a water bath for about two hours.

7. The method of preparing mixed anhydrides of dialkyldithiophosphoric acid and carboxylic acids which comprises reacting diethyldithiophosphoric acid with substantially an equimolar amount of 4-nitrobenzoic acid anhydride by heating the same on a water bath for about two hours.

8. The method of preparing mixed anhydrides of dialkyldithiophosphoric acid and carboxylic acids which comprises reacting diethyldithiophosphoric acid with substantially an equimolar amount of 4-toluic acid anhydride by heating the same on a water bath for about two hours.

References Cited by the Examiner

UNITED STATES PATENTS

| | | | |
|---|---|---|---|
| 2,198,915 | 4/1940 | MacAfee | 260—461.1 |
| 2,266,514 | 12/1941 | Romieux et al. | 260—461.1 |
| 2,373,811 | 4/1945 | Cook et al. | 260—935 |
| 2,545,158 | 3/1951 | McDermott et al. | 260—461.1 |
| 2,579,434 | 12/1951 | Kenega | 167—30 |
| 2,611,729 | 9/1952 | Bartlett et al. | 167—30 |
| 2,648,696 | 8/1953 | Whetstone | 260—461.1 |
| 2,659,747 | 11/1953 | Young | 260—935 |
| 2,931,824 | 4/1960 | Schrader | 260—461.112 |
| 2,998,347 | 8/1961 | Fancher et al. | 260—461.112 |

OTHER REFERENCES

Degering et al.: "An Outline of Organic Chemistry," Barnes & Noble, Inc., New York, New York (1937), pp. 84–85.

Kabachnik et al.: "Bull. Acad. Sci. U.S.S.R., Div. Chem. Sci.," (English Translation), (1954), pp. 369–373.

Zemlyansky et al.: "J. Gen. Chem. U.S.S.R.," (English Translation), volume 26, pp. 1881–1882.

CHARLES B. PARKER, *Primary Examiner.*

IRVING MARCUS, FRANK M. SIKORA

*Assistant Examiners.*